July 1, 1969   D. W. B. MUIR ET AL   3,453,440
OPTICAL INSPECTION DEVICES EMPLOYING LIGHT-CONDUCTING FIBERS
Filed Dec. 14, 1965
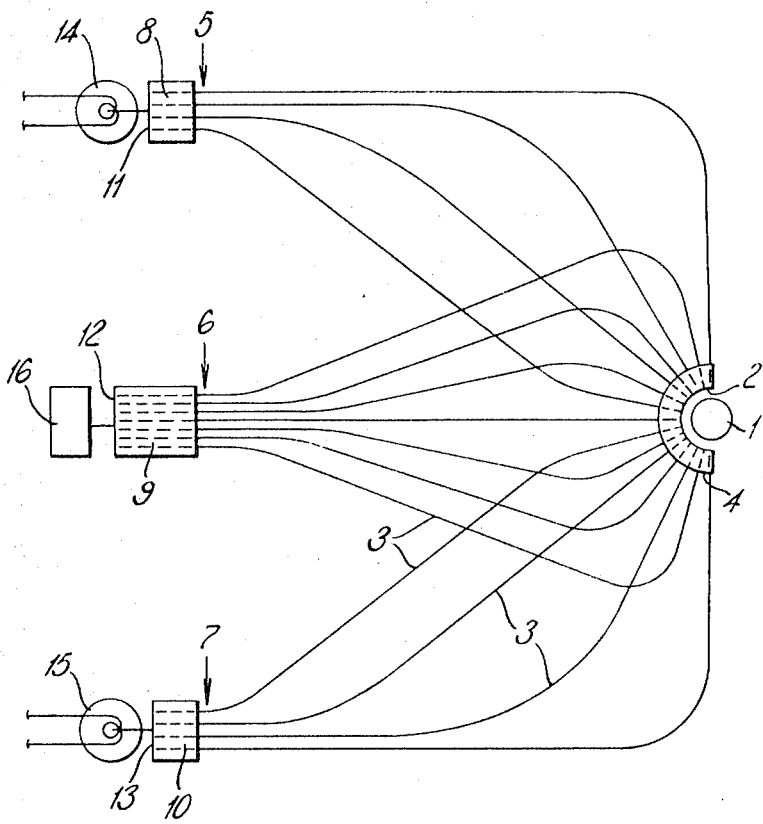
Inventors:
Douglas Wm. B. Muir
Philip Frank Heder
Watson, Cole, Grindle & Watson
Attorneys United States Patent Office 3,453,440
Patented July 1, 1969

3,453,440
OPTICAL INSPECTION DEVICES EMPLOYING LIGHT-CONDUCTING FIBERS
Douglas William Ballantyne Muir, London, England, and Philip Frank Hider, Ottawa, Ontario, Canada, assignors to The Molins Organisation Limited, London, England
Filed Dec. 14, 1965, Ser. No. 513,702
Claims priority, application Great Britain, Dec. 15, 1964, 51,056/64
Int. Cl. H01j 5/16, 39/12; G02b 5/16
U.S. Cl. 250—227         4 Claims

ABSTRACT OF THE DISCLOSURE

An optical inspection device embodies two or more groups of light-conducting fibers, one end of each fiber of all the groups being embodied in a common light-transmitting surface of complementary form to that of articles to be inspected. In said surface, the ends of the fibers of any one group are intermingled with ends of the fibers of at least one other group. The other ends of the fibers of each group form a further light-transmitting surface.

---

This invention relates to optical inspection devices. One example of the type of device to which the invention is applicable is a device for checking the position and/or density of printing on an article such as cigarettes.

It is known to check the position and density of printing on an article by passing the article through a zone subject to a standard illumination, collecting light reflected from the article, and applying such reflected light to a photo-electric cell. Electric signals from the cell then indicate by their amplitude the print density and by their timing (relative to the movement of the article) the print position.

In many instances, it is difficult to arrange for both the illuminating and viewing optical systems to have proper access to the article to be inspected, especially when the article is of curved or irregular shape. A cylindrical article such as a cigarette provides a good example of the difficulty encountered—the printing to be inspected is usually applied along lines extending circumferentially of the cigarette, thus there is a requirement for even illumination of a strip of convex cylindrical curvature necessitating a relatively complex optical system, and a complementary system for conducting reflected light to the photo-electric cell.

It is an object of the present invention to provide an improved device suitable for illumination and viewing of articles to be inspected.

According to the invention we provide an optical inspection device including a first light-transmitting surface of complementary form to that of articles to be inspected, a plurality of light-conducting fibers each having one of its ends embodied in said surface, and means holding the other ends of said fibers in such positions as to form at least two groups, each group providing a further light-transmitting surface, the fibers being so assembled that the fibers in each group are associated with spaced areas of the first light-transmitting surface, said spaced areas also containing ends of fibers of at least one other group.

By "light-conducting fibers" we mean fine threads or strands of transparent material adapted to transmit light from end to end without substantial leakage of such light through their side walls. This is achieved with any rod or thread of transparent material having a refractive index substantially higher than the ambient air or other medium, as no appreciable proportion of light rays entering an end face of the rod or thread strike the walls thereof at a sufficiently small angle of incidence (measured from the normal) to be transmitted through said walls. The threads we employ are preferably held in intimate contact in their groups and therefore we prefer to employ composite or coated threads, e.g. glass threads each carrying a coating of glass of a suitably different refractive index, so as to ensure the maximum possible internal reflection, either at the interface between the two types of glass or at the outer surface of the coating, even if the outside of the fibers is contaminated with material of higher refractive index. The end faces of the threads are necessarily cut normal to the lengths of the threads and preferably are ground and polished to the standards of so-called "optical flats."

With a device embodying the invention, we employ a light source confronting one of the further light-transmitting surfaces; light from such source then travels along the fibers of the associated group, emerges from the other ends of such fibers i.e. at spaced areas of the first light-transmitting surface. Any light reflected from an article facing said first surface enters fibers of the other group or groups and travels therealong to the other light-transmitting surface or surfaces; at least one of the latter confronts a photo-electric cell or the like which thus emits electric signals controlled by such deflected light.

Adjacent each of the light-transmitting surfaces the fibers which end in that surface require to be held together in positions normal to that surface (or in the case of a curved surface, normal to the tangent to that surface at the point at which the fiber meets it) and preferably in contact, each with its neighbours. We prefer to accomplish this by moulding a block of plastic material around the end portions of the fibers, i.e. by "encapsulating" such end portion; in many applications a single such block may be moulded around the whole of the fibers to retain them in fixed relative positions.

In order that the invention may be well understood, we will now describe a preferred embodiment thereof, shown diagrammatically in the accompanying drawing.

The device so illustrated is designed for optical inspection of a cylindrical article such as a cigarette, indicated at 1. Around one-half the circumference of the article 1 is provided a light-transmitting surface 2 of concave half-cylindrical form, i.e. complementary in form to the surface of the article 1 which it faces. The surface 2 is formed by the ends of a plurality of glass fibers 3. For clarity, only a few fibers 3 are shown and to illustrate the actual numbers of fibers employed it should be noted that the diameter of such fibers is 25 microns; thus if the diameter of the article 1 is 7 millimetres, a single row of fiber ends facing one-half the circumference of the article will contain some 440 fibers. With several rows of fibers, giving the surface 2 an axial length (measured normal to the plane of the drawing) of one-quarter millimetre, the total number of fibers employed is at least about 4,400.

The ends of the fibers 3 forming surface 2 are held in assembled relation by a block 4; conveniently said block 4 comprises plastic material moulded around the ends of the fibers.

The ends of the fibers 3 remote from the surface 2 are assembled into three groups 5, 6, 7 and held so assembled by blocks 8, 9, 10 respectively so that the groups provide respective further light-transmitting surfaces 11, 12, 13. The group 6 contains fibers extending to spaced areas all over surface 2; groups 5, 7 contain fibers extending to spaced areas in the upper and lower halves of surface 2 respectively. Confronting the surfaces 11, 13 we provide mutually similar lamps 14, 15 and confronting the surface 12 we provide a photo-electric cell 16.

The ends of the fibers of group 6 are substantially uniformly distributed over the whole of surface 2, and those of groups 5 and 7 are similarly distributed over the upper and lower halves of said surface. Thus considering a row of fibers in the upper half of said surface, for example, the end of each fiber associated with group 6 lies between the ends of two fibers of group 5. Light emerges from the ends of the two latter fibers, having travelled through said fibers from surface 11, illuminated by lamp 14, to illuminate the adjoining surface of article 1. Light reflected from the article enters the end of the fiber of group 6 and travels along this fiber to the surface 12, and thence to photo-electric cell 16.

It will be understood that light emerging from one of the fibers 3 does so as a slightly divergent beam, due to successive internal reflections of part of the light travelling through the fiber; where the fiber is other than straight, all the light travelling through it undergoes internal reflection at some stage. In any event, it is found in practice that there is sufficient divergence for the light from any one fiber to reach an adjoining fiber after reflection from the article under inspection, even when the surface of the article is of such a nature that such reflection is of a largely specular nature.

In use, due to the extremely small area of the cross-section of a fiber the surface 2 appears evenly illuminated and for all practical purposes the device behaves as if this were so. Equally, the surface 2 behaves as if the whole surface were in light-transmitting relation to the photo-electric cell.

It will therefore be seen that the invention provides a device which, while simple, is efficient in use and offers notable advantages over prior devices. Various changes or modifications in details of the device described are possible without departure from the scope of the invention. For example, in place of the two groups of fibers 5, 7 and the two lamps 14, 15 we may assemble all these fibers into a single group so that only one lamp is needed, in which event the single lamp will need to provide a larger light-emitting area than either of the two lamps shown.

What we claim as our invention and desire to secure by Letters Patent is:

1. An optical inspection device comprising a plurality of light-conducting fibers, one end of each of said fibers forming collectively a first light-transmitting surface, the other ends of said fibers being divided into at least two groups such that the ends of the fibers in each group form a further light-transmitting surface, the fibers being so assembled that in the first light-transmitting surface the ends of the fibers of any one group are intermingled with the ends of fibers of at least one other group, and a block of plastic material enclosing end portions of all of the fibers adjacent to said first light-transmitting surface and retaining said end portions in such relative positions that said first light-transmitting surface is of a configuration substantially complementary to that of articles to be inspected, whereby light transmitted through the fibers of one of said groups will evenly illuminate said first light-transmitting surface and said articles.

2. A device as claimed in claim 1, including a light source confronting one of the further light-transmitting surfaces and a photo-electric cell confronting another of the further light-transmitting surfaces.

3. A device as claimed in claim 1, including a block of plastic material enclosing end portions of the fibers adjacent each of the light-transmitting surfaces.

4. A device as claimed in claim 3, in which a single block of plastic material encloses the whole of the fibers so as to retain them in fixed relative positions.

References Cited

UNITED STATES PATENTS

| | | | |
|---|---|---|---|
| 2,922,884 | 1/1960 | Fearnside. | |
| 3,173,018 | 3/1965 | Grim | 250—227 |
| 3,327,584 | 6/1967 | Kissinger | 350—96 X |
| 3,068,742 | 12/1962 | Hicks et al. | 250—227 |
| 3,091,235 | 5/1963 | Richards | 128—6 |
| 3,120,125 | 2/1964 | Vasel | 250—227 |
| 3,141,094 | 7/1964 | Strickler | 250—227 |
| 3,267,932 | 8/1966 | Valliere | 128—6 |

ROBERT SEGAL, *Primary Examiner.*

V. LAFRANCHI, *Assistant Examiner.*

U.S. Cl. X.R.

131—20; 350—96